United States Patent [19]

Bert

[11] Patent Number: 5,299,740
[45] Date of Patent: Apr. 5, 1994

[54] PLURAL COMPONENT AIRLESS SPRAY GUN WITH MECHANICAL PURGE

[75] Inventor: Jeffrey D. Bert, Denver, Colo.

[73] Assignee: Binks Manufacturing Company, Franklin Park, Ill.

[21] Appl. No.: 852,573

[22] Filed: Mar. 17, 1992

[51] Int. Cl.⁵ ............................................. B05B 15/02
[52] U.S. Cl. ..................................... 239/117; 239/114; 239/414; 239/527
[58] Field of Search ............... 239/114, 123, 527, 413, 239/414, 526, 432, 398, 427, 427.3, 117, 115, 116

[56] References Cited

U.S. PATENT DOCUMENTS

| | | | |
|---|---|---|---|
| 1,265,768 | 5/1918 | Fuller | 239/117 |
| 1,289,234 | 12/1918 | Nitz | 239/117 |
| 1,661,150 | 2/1928 | Birkenmaier | 239/527 |
| 2,890,836 | 6/1959 | Gusmer et al. | 239/527 |
| 3,111,271 | 11/1963 | Lofgren | 239/117 |
| 3,366,337 | 1/1968 | Brooks et al. | |
| 3,786,990 | 1/1974 | Hagfors | 239/117 |
| 4,133,483 | 1/1979 | Henderson | |
| 4,377,256 | 3/1983 | Commette et al. | 239/123 |
| 4,453,670 | 6/1984 | Sirovy | 239/117 |
| 4,471,887 | 9/1984 | Decker | 239/123 |
| 4,597,526 | 7/1986 | Egli et al. | 239/123 |
| 4,708,292 | 11/1987 | Gammons | 239/414 |
| 4,867,346 | 9/1989 | Faye et al. | 239/123 |
| 5,044,555 | 9/1991 | Youngeberg et al. | 239/117 |
| 5,090,814 | 2/1992 | Petcen | 222/145 |
| 5,104,006 | 4/1992 | Brown | 239/123 |

Primary Examiner—Andres Kashnikow
Assistant Examiner—Christopher G. Trainor
Attorney, Agent, or Firm—Juettner Pyle & Lloyd

[57] ABSTRACT

A plural component airless spray gun for mixing and dispensing coreactive liquid materials has a mixing chamber into which coreactive components are introduced and mixed, an airless tip at a forward end of the chamber and from which the mixed components are emitted in a fan-shaped spray, and a mechanical purging rod that is actuable to clean residual mixed components from both the mixing chamber and the airless tip. The purging rod which has a main body of a diameter slightly less than that of the mixing chamber, and a forward end that defines a probe of a diameter that is slightly less than the dimension of the minor axis of an elongate orifice of the airless tip. During spraying, the purging rod is retracted rearwardly of the mixing chamber and of coreactive fluid inlets to the chamber. Upon completion of spraying or periodically as desired, the purging rod is moved forwardly through the mixing chamber until the probe at the forward end of the purging rod extends through the airless tip orifice, to clean both the mixing chamber and the orifice of residual reactive components.

4 Claims, 3 Drawing Sheets

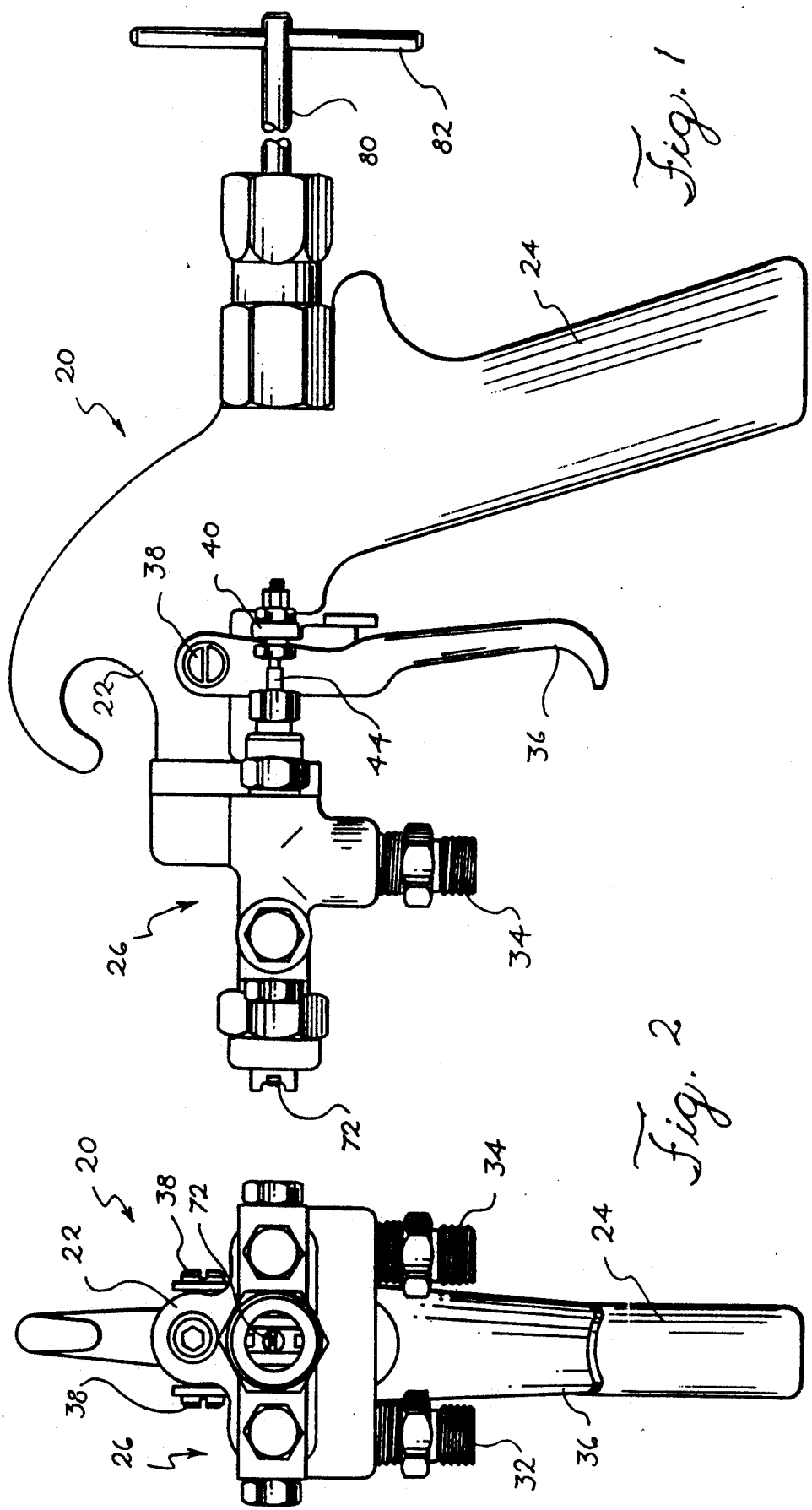

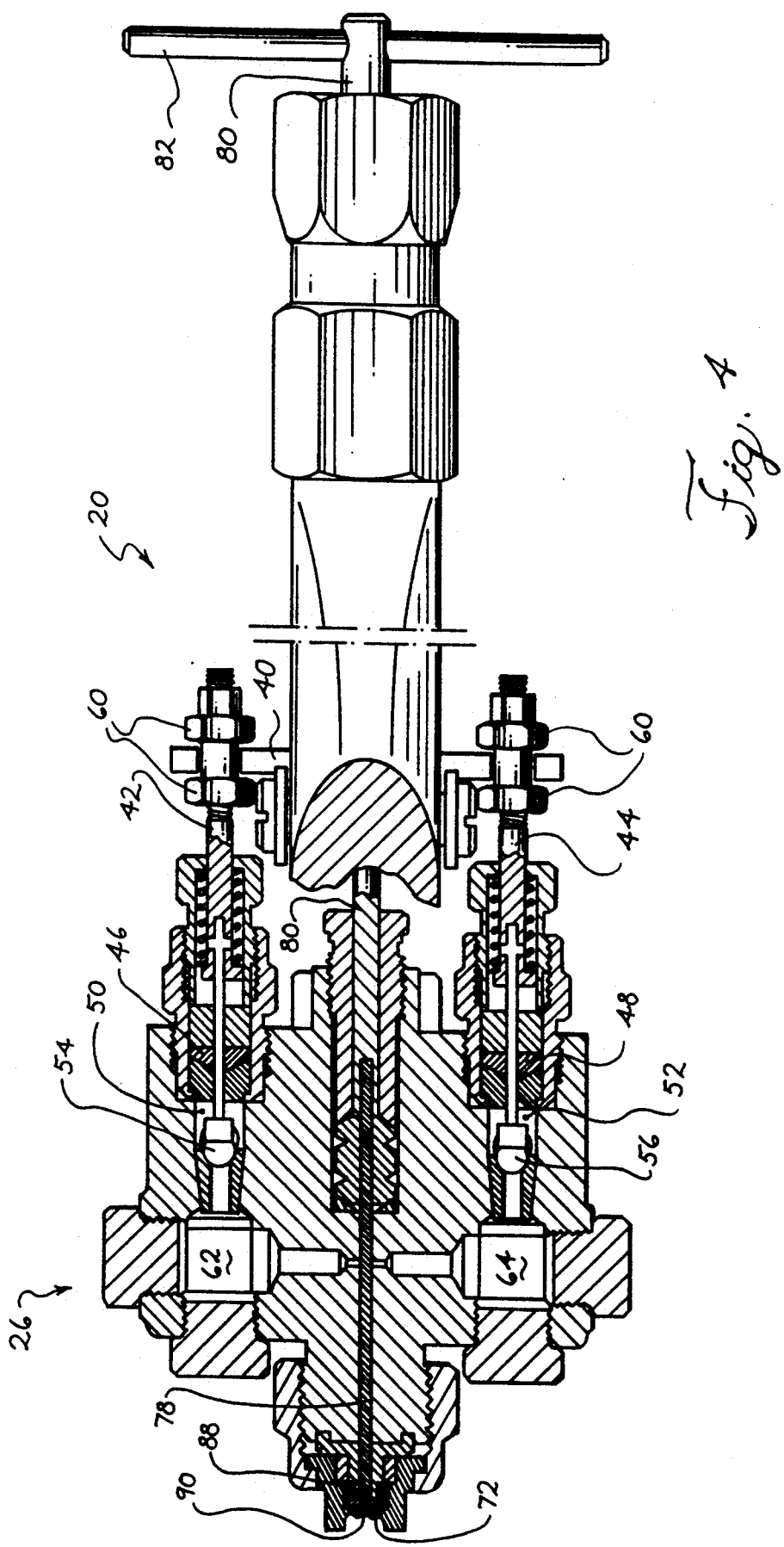

PLURAL COMPONENT AIRLESS SPRAY GUN WITH MECHANICAL PURGE

BACKGROUND OF THE INVENTION

The present invention relates to plural component spray guns, and in particular to a device for purging residual mixed components from a mixing chamber and an airless fluid tip of a plural component airless spray gun.

The purging device of this invention finds use in plural component plastic application equipment or guns of the general type described and claimed in U.S. Pat. No. 3,366,337, issued Jan. 30, 1968, wherein two coreactive streams of chemicals are intimately mixed within the gun and dispensed from an airless tip in a spray.

One problem which arises in prior art plural component guns is that, between operations, the residual material in the mixing chamber and/or in the outlet nozzle tends to harden, thereby making further mixing and dispensing impossible until the chamber and nozzle are purged of the hardened residue. In the aforementioned U.S. Pat. No. 3,366,337, purging is accomplished by manually opening a needle valve to admit a flow of solvent and/or air through the chamber and nozzle to remove the residue. This purging procedure, however, has several disadvantages. First, the use of solvent adds unnecessary expense to the spraying process. Second, because of being ejected under pressure, the solvent is dispersed into the surrounding air and creates potential safety and environmental health problems. Further, the blast of solvent and/or air, while forcefully ejecting hardened residue, scatters the residue haphazardly. Overall, this cleaning arrangement is unsatisfactory.

Other prior art arrangements utilize a rod to eject excess material, such as for example in Henderson U.S. Pat. No. 4,133,483. The gun there described is for mixing and dispensing plural component plastic materials, and the rod that performs the purging process is normally positioned rearwardly of both the mixing chamber and of reactive component inlet orifices to the chamber, and is selectively movable forwardly through the chamber to purge the chamber of residual material. The gun has a circular fluid outlet orifice from the mixing chamber and does not utilize either pneumatics or hydraulics to atomize emitted materials; rather, the mixed components "pour" out of the gun.

OBJECTS OF THE INVENTION

An object of the present invention is to provide a plural component airless spray gun, which can readily be mechanically purged of residual reactive materials.

Another object is to provide such a spray gun, which is mechanically purged in a manner to clean both a coreactive component mixing chamber within the gun and an airless tip at a forward end of the mixing chamber.

SUMMARY OF THE INVENTION

In accordance with the present invention, a plural component mixing and dispensing spray gun comprises a body and a head secured to the body. The head has a mixing chamber, an outlet at a forward end of the chamber and inlet openings communicating with the chamber. An airless tip at the forward end of the chamber has an elongate orifice and a passage extending between the orifice and the chamber outlet, and means are provided for intermittently feeding streams of reactant liquids through the inlet openings into the chamber, so that the liquids from a reactive mixture which flows forwardly through the chamber and from the outlet into and through the airless tip passage to the airless tip orifice for emission from the orifice in a spray. A purging rod having a probe at its forward end is received in an opening in the head, which opening is axially aligned with and rearwardly of the mixing chamber, and means is provided for moving the purging rod from a normally retracted position rearwardly of the mixing chamber and the inlet openings, forwardly through the chamber until the probe extends through the airless tip orifice, to purge the chamber and the airless tip passage and orifice of residual reactive mixture.

In a preferred structure of the spray gun, the mixing chamber and the airless tip passage are generally cylindrical and axially aligned, and the airless tip orifice has major and minor axes that are generally perpendicular to the airless tip passage axis. The purging rod has a cylindrical main portion of a first diameter that is slightly less than the diameter of the mixing chamber, a cylindrical airless tip passage cleaning portion at a forward end of and axially aligned with the main body portion and of a second diameter that is smaller than the first diameter and slightly smaller than the diameter of the airless tip passage, and the probe is cylindrical and at the forward end of and axially aligned with the airless tip passage cleaning portion and is of a third diameter that is smaller than the second diameter and slightly smaller than the dimension of the airless tip orifice minor axis. Upon forward movement of the purging rod through the mixing chamber, the main body portion moves into and through the mixing chamber, the airless tip passage cleaning portion moves into and through the airless tip passage, and the probe moves into and through the airless tip orifice to purge the mixing chamber and the airless tip passage and orifice of residual mixed reactants by pushing the reactants from and through the mixing chamber and the airless tip passage to and out of the airless tip orifice.

The foregoing and other objects, advantages and features of the invention will become apparent upon a consideration of the following detailed description, when taken in conjunction with the accompanying drawings.

BRIEF DESCRIPTION OF THE DRAWINGS

FIG. 1 is a side elevation view of a plural component airless spray gun that embodies the teachings of the invention;

FIG. 2 is a front elevation view of the spray gun;

FIG. 4 is a top plan view, partly in cross section, showing the purging rod in its extended operative position.

DETAILED DESCRIPTION

Figure 3:
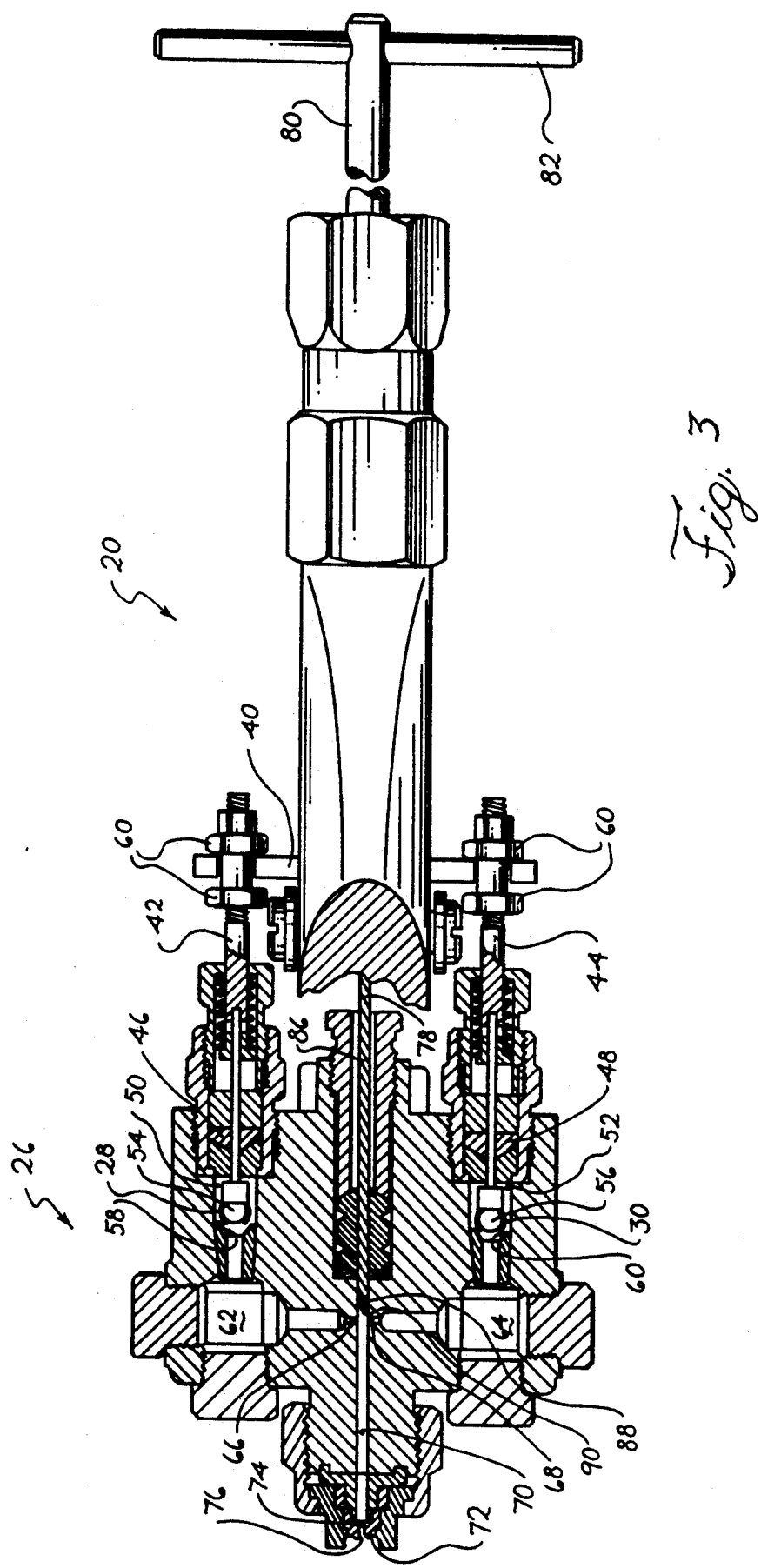
FIG. 3 is a top plan view of the spray gun, partly in cross section, showing a purging rod of the gun in a retracted position.

An internal mix plural component airless atomizing spray coating apparatus as shown in the drawings may take the form of a hand held airless spray gun, indicated generally at 20. The spray gun includes a gun body 22 having a rearward handle 24 that is grippable by an operator to hold and manipulate the gun. At its forward end the body carries a head indicated generally at 26 and having a pair of liquid inlet passages 28 and 30

(FIG. 3), lower ends of which passages connect through respective fittings 32 and 34 to respective supplies of coreactive liquid materials.

A trigger 36 is pivotally connected at 38 to the gun body 22 for actuating a fluid valve means that includes a transversely extending bar 40 coupled to the trigger. The trigger is movable between a forward position where the fluid valve means is closed and a rearward position toward the gun handle to open the fluid valve means. The fluid valve means also includes a pair of valve stems 42 and 44 extending forwardly from the bar through respective packings 46 and 48 into chambers 50 and 52 that communicate with respective ones of the liquid inlet passages 28 and 30. At their forward ends the valve stems 42 and 44 carry respective balls 54 and 56 that are moved against associated seats 58 and 60 to interrupt flows of liquid materials through the seats when the trigger is in its forward position, and that are moved off of the seats to establish paths for flows of liquid materials through the seats when the trigger is retracted. The extent of movement of the balls off of the seats when the trigger is fully retracted is determined by appropriate adjustment of nuts 60 that connect rearward ends of the valve stems to the bar.

The head 26 also includes a pair of transversely extending and opposed fluid passages 62 and 64. Upon movement of the trigger 36 toward the handle 24 and retraction of the valve stems 42 and 44, the passage 62 is placed into communication with the liquid inlet passage 28 and the passage 64 is placed into communication with the liquid inlet passage 30, so that one of the liquid reactants is then delivered to the passage 62 and the other to the passage 64. A pair of impingement openings 66 and 68 communicate with the fluid passages 62 and 64, respectively, and are diametrically opposed to and open towards each other into a rearward or inner end of a mixing chamber 70. The mixing chamber extends longitudinally through the head and has an outlet at its forward end where it terminates at an airless tip 72. The airless tip has a longitudinal passage 74 that extends forwardly from the mixing chamber outlet to an elongate orifice 76. Upon retraction of the gun trigger, liquid chemical reactants are supplied to the impingement openings 66 and 68 at a pressure of from about 500 to about 3000 pounds per square inch, and upon flowing from the impingement openings the streams of liquid chemical reactants impinge against each other in the mixing chamber. The chemical reactants become thoroughly mixed within the chamber and flow forwardly through the chamber into and through the longitudinal passage 74 of the airless tip to the elongate orifice 76 for emission from the orifice in a fan-shaped film of liquid that breaks up at its forward edge into a fan-shaped atomized spray.

To the extent described, the plural component spray gun 20 is generally the same as the spray gun described in aforementioned U.S. Pat. No. 3,366,337, the teachings of which are specifically incorporated herein by reference. However, unlike the spray gun of U.S. Pat. No. 3,366,337, which introduces solvent and/or air into the mixing chamber to remove residual reactants from the chamber and from the airless tip, the spray gun of the invention advantageously utilizes a mechanical purging rod 78 for the purpose. The purging rod is carried at the forward end of a rod driving stem 80 that extends through the spray gun body 22 and has a handle 82 at its rearward end for manually moving the stem, and therefore the purging rod, in longitudinal directions, for example by providing a threaded connection between the stem and the gun body so that the stem and purging rod are moved forwardly and rearwardly by clockwise and counterclockwise rotation of the handle.

The purging rod 78 extends forwardly from the stem 80 through a packing and into a rearward opening to the mixing chamber 70. The purging rod has a cylindrical main body portion 86 that is received within the packing and has a first diameter that is slightly less than the diameter of the mixing chamber. A cylindrical airless tip passage cleaning portion 88 extends forwardly from the front end of the main body portion, it has a second diameter that is smaller than the diameter of the main body portion and slightly smaller than the diameter of the airless tip passage 74, and it is adapted to enter the airless tip passage when the purging rod is extended. At the very forward end of the purging rod is a cylindrical probe 90 that extends forwardly from the forward end of the airless tip passage cleaning portion and has a third diameter which is smaller than the diameter of the airless tip passage cleaning portion and slightly smaller than the dimension of the minor axis of the airless tip elongate orifice 76. The probe is adapted to extend through the center of the airless tip orifice when the purging rod is fully extended.

In operation of the spray gun 20, during a spraying operation the purging rod 78 is retracted, such that the probe 90 at its forward end is rearwardly of the mixing chamber 70 and of the coreactive component impingement openings 66 and 68. When the gun is triggered on, opposed streams of reactive liquid components flow from the impingement openings into impingement with each other in the mixing chamber. The reactive components are thoroughly mixed with each other within the chamber and flow forwardly through the chamber to and through the longitudinal airless tip passage 74 to the elongate airless tip orifice 76 for emission in an unstable fan-shaped film that breaks up at its forward edge into a fan-shaped atomized spray. While the gun is triggered on and coreactive components are flowing through the mixing chamber, the components normally do not set up hard within the chamber before the chamber can be cleared by the purging rod 78. However, as the components flow through the mixing chamber, a boundary layer of the components forms on the wall of the chamber. The boundary layer is somewhat stagnant, and as the spraying operation continues the boundary layer begins to harden. Should a sufficiently long time be allowed to lapse before the boundary layer is cleaned from the mixing chamber, it not only will set up sufficiently hard to resist removal by the purging rod, but it will also grow radially inwardly of the mixing chamber wall and eventually close off the flow path through the chamber. The invention therefore contemplates that the purging rod be used to clean the mixing chamber at sufficiently short intervals to prevent a hardened boundary layer of reactive components from forming within the chamber.

Accordingly, upon completion of spraying or periodically as necessary, the purging rod 78 is moved forwardly through the mixing chamber 70, from its retracted position as shown in FIG. 3 to its extended position as shown in FIG. 4. As the purging rod is moved forwardly through the chamber, the shoulder defined between the first diameter main body portion 86 and the second and smaller diameter airless tip passage cleaning portion 88 scrapes the boundary layer of coreactive components off of the chamber wall and pushes the thickened mixture forwardly through the chamber to and through the airless tip passage 74 to and out of the airless tip orifice 76. When the airless tip passage cleaning portion 88 of the purging rod moves into and through the airless tip passage, the thickened mixture of the reactive components is pushed from the passage and out of the orifice, and with further forward movement of the purging rod, the probe 90 is moved into and through the airless tip orifice to clear the orifice. Since the diameter of the probe is slightly less than the dimension of the minor axis of the orifice, as the probe moves into and through the orifice, portions of the orifice to opposite sides of the probe and lying along the major axis of the orifice remain open to accommodate a continued outflow from the orifice of the thickened mixture as it is pushed from the airless tip passage by the purging rod passage cleaning portion. After the purging rod has been fully extended to complete cleaning of the mixing chamber and the airless tip, it is retracted in preparation for the next spraying operation.

The invention therefore provides an improved apparatus for cleaning residual mixed reactants from the interior of a plural component airless spray gun. By virtue of using a mechanical purging rod to clean the mixing chamber and the airless tip of the gun, the invention enables the gun to be frequently and conveniently purged without the use of solvent and before the mixed reactants can harden to the point resisting removal.

While one embodiment of the invention has been described in detail, various modifications and other embodiments thereof may be devised by one skilled in the art without departing from the spirit and scope of the invention, as defined in the appended claims.

What is claimed is:

1. A plural component mixing and dispensing spray gun, comprising a gun body; a head secured to the body, said head including a mixing chamber having an outlet at its forward end and inlet openings communicating with said mixing chamber; an airless tip carried by said head at said mixing chamber outlet, said airless tip having an elongate orifice and a passage extending between said orifice and said outlet; means for intermittently feeding streams of reactant liquids through said inlet openings into said mixing chamber for mixing of the liquids in said chamber and flow of the reactive mixture through said chamber and said outlet into and through said airless tip passage to and through said airless tip orifice; a purging rod received in an opening in said head, said opening being axially aligned with and rearwardly of said mixing chamber, said purging rod having a probe at its forward end; and means for moving said purging rod from a normally retracted position rearwardly of said inlet openings, forwardly through said mixing chamber until said probe extends through said airless tip orifice, to purge said mixing chamber and said airless tip passage and orifice of residual reactive mixture, wherein said mixing chamber and said airless tip passage are cylindrical and axially aligned, said airless tip orifice has major and minor axes that are generally perpendicular to said airless tip passage axis, and said purging rod has a cylindrical main body portion of a first diameter that is slightly less than the diameter of said mixing chamber, a cylindrical airless tip passage cleaning portion at a forward end of and axially aligned with said main body portion and of a second diameter that is smaller than said first diameter and slightly smaller than the diameter of said airless tip passage, and said probe is cylindrical and is at the forward end of and axially aligned with said airless tip passage cleaning portion and is of a third diameter that is smaller than said second diameter and slightly smaller than the dimension of said airless tip orifice minor axis, whereby upon forward movement of said purging rod through said mixing chamber, said main body portion moves into and through said mixing chamber, said airless tip passage cleaning portion moves into and through said airless tip passage, and said probe moves into and through said airless tip orifice to purge said mixing chamber and said airless tip passage and orifice of residual mixed reactants by pushing the residual mixed reactants from and through the mixing chamber and the airless tip passage to and through the airless tip orifice.

2. A plural component mixing and dispensing spray gun as in claim 1, wherein said gun body has a trigger, said means for intermittently feeding is actuated by said trigger, and said means for moving said purging rod is operable independent of said trigger actuated feeding means.

3. A plural component mixing and dispensing spray gun as in claim 1, wherein the axial lengths of said airless tip passage and of said purging rod airless tip passage cleaning portion are substantially the same.

4. A plural component mixing and dispensing spray gun as in claim 3, wherein said moving means comprises a stem connected at its forward end to a rearward end of said purging rod and a manually manipulatable handle at a rearward end of said stem for moving said stem, and thereby said purging rod, forwardly and rearwardly.

* * * * *